United States Patent [19]

Dworkin et al.

[11] 4,085,077

[45] Apr. 18, 1978

[54] METHOD FOR STABILIZING VINYL CHLORIDE POLYMERS

[75] Inventors: Robert Dally Dworkin, Old Bridge; Adam Joseph Ejk, Piscataway, both of N.J.

[73] Assignee: M&T Chemicals Inc., Stamford, Conn.

[21] Appl. No.: 660,478

[22] Filed: Feb. 23, 1976

[51] Int. Cl.$^2$ ................................ C08K 5/57
[52] U.S. Cl. ................ 260/23 XA; 260/45.7 PH; 260/45.75 T; 260/45.85 R; 260/45.8 A; 260/45.95 R
[58] Field of Search ......... 260/23 XA, 23.7 M, 45.85, 260/45.8 A, 45.75 T, 45.95

[56] References Cited

U.S. PATENT DOCUMENTS

| | | | |
|---|---|---|---|
| 2,394,418 | 2/1946 | Quattlebaum et al. | 260/45.75 T |
| 2,826,561 | 3/1958 | Gloskey | 260/45.75 T |
| 2,993,234 | 7/1961 | Miura et al. | 260/23 XA |
| 3,080,338 | 3/1963 | Nudenberg et al. | 260/45.7 |
| 3,090,768 | 5/1963 | Ray et al. | 260/45.75 T |
| 3,255,134 | 6/1966 | Rowe | 260/23 XA |
| 3,442,837 | 5/1969 | Brotz et al. | 260/23 XA |
| 3,463,751 | 8/1969 | Hasegawa et al. | 260/23 XA |
| 3,479,309 | 11/1969 | Hecker et al. | 260/23 XA |
| 3,679,619 | 7/1972 | Stapfer et al. | 260/23 XA |
| 3,793,274 | 2/1974 | Hiyama et al. | 260/23 XA |
| 3,901,839 | 8/1975 | Lonning | 260/23.7 M |
| 3,907,932 | 9/1975 | Kennedy et al. | 260/45.75 T |

OTHER PUBLICATIONS

SPE Journal-Aug., 1963, pp. 729 to 734.
British Plastics – May, 1957, pp. 183 to 186.

*Primary Examiner*—V. P. Hoke
*Attorney, Agent, or Firm*—Kenneth G. Wheeless; Robert Spector

[57] ABSTRACT

The presence of free carboxylic acids containing from 8 to 20 carbon atoms or the anhydrides of these acids inhibits the rate of heat induced discoloration exhibited by certain polymer formulations containing as a heat stabilizer the reaction product of a carboxylic acid with a stoichiometric excess, based on the number of carboxyl groups present, of a diorganotin oxide. The free acids are virtually ineffective heat stabilizers for these polymers in the absence of the aforementioned reaction product. The polymers which can be stabilized include vinyl chloride polymers and acrylonitrile-butadiene-styrene terpolymers.

14 Claims, No Drawings

METHOD FOR STABILIZING VINYL CHLORIDE POLYMERS

BACKGROUND

This invention relates to the stabilization of certain polymers against the degradative effects of heat. This invention further relates to improving the heat stability imparted to these polymers by a known class of diorganotin compounds.

It is well known that many diorganotin compounds are effective heat stabilizers for vinyl chloride polymers and acrylonitrile-butadiene-styrene terpolymers. Considered as a class, compounds containing tin-sulfur bonds, such as dibutyltin-S,S′-bis(isooctyl mercaptoacetate), retard heat-induced degradation and discoloration over a longer period of time than diorganotin compounds with tin-oxygen bonds. The presence of sulfur-containing organotin compounds may be undesirable in those instances where a completely colorless formulation is required, since these compounds may impart a yellow tinge to the formulation. In addition, many of these stabilizers have unpleasant odors at the elevated temperatures employed to process the polymer formulation. Formulations containing diorganotin derivatives of carboxylic acids, such as dibutyltin dilaurate and dibutyltin maleate, are often superior with regard to initial color to those incorporating sulfur-containing stabilizers, but may lack the desired long term heat stability.

Diorganotin maleates retard initial discoloration and also impart relatively long term heat stability, however at elevated temperatures these compounds produce vapors which not only have an unpleasant odor, but are particularly irritating to the eyes and respiratory tract. Many of the diorganotin carboxylates decompose to some extent at elevated temperatures yielding vapors of the corresponding acids. While not as noxious as the heated diorganotin maleates, these vapors are unpleasant. The diorganotin carboxylates should therefore be employed only when adequate ventilation is available. Diorganotin carboxylates are conventionally prepared by reacting the acid with a stoichiometric amount of a diorganotin oxide. One mole of oxide is present for every 2 moles of carboxyl (—COOH) groups. It has been found that vaporization of diorganotin carboxylates can be reduced if these compounds are prepared using a stoichiometric excess of the corresponding diorganotin oxide. Preferably between 1.1 and about 4 moles of oxide are reacted for every two moles of carboxyl groups. The odor of molten polymer formulations containing these "overbased" diorganotin carboxylates, particularly the maleates, may still be so offensive and irritating as to preclude the use of these stabilizers for many applications, irrespective of the high level of heat stability that they impart to a polymer formulation. It is therefore an objective of this invention to eliminate or reduce to a negligible extent the vaporization of overbased diorganotin carboxylates that occurs at temperatures between 150° and 200° C., the range wherein vinyl chloride polymers and acrylonitrile-butadiene-styrene terpolymers are conveniently processed. It has now been found that this objective can be achieved by combining an "overbased" diorganotin carboxylate with a mono- or dicarboxylic acid containing from 8 to 20 carbon atoms.

Surprisingly the presence of a free carboxylic acid or anhydride not only reduces odor, but also significantly improves the heat stability imparted to polymer formulations by overbased diorganotin carboxylates. The latter is quite unexpected, since free carboxylic acids and anhydrides are not effective heat stabilizers.

SUMMARY OF THE INVENTION

This invention provides a method for increasing the resistance to heat induced discoloration, decomposition and odor imparted to vinyl chloride polymers and acrylonitrile-butadiene-styrene terpolymers by a reaction product of a mono- or dicarboxylic acid or an anhydride of said acid with a stoichiometric excess of a diorganotin oxide wherein the number of moles of diorganotin oxide reacted is from 0.55 to 2.0 times the number of equivalents of said mono- or dicarboxylic acid or anhydride, the method consisting essentially of employing said reaction product in combination with an unreacted mono- or dicarboxylic acid containing from 8 to 20 carbon atoms or an anhydride of said acid wherein the unreacted acid or anhydride constitutes between 1 and 90% of the combined weight of the unreacted acid or anhydride and said reaction product.

DETAILED DESCRIPTION OF THE INVENTION

The first component of the present stabilizer compositions is the reaction product of a mono- or dicarboxylic acid containing from 4 to 20 carbon atoms with a stoichiometric excess of a diorganotin oxide. The number of moles of diorganotin oxide residues present in the reaction product is from about 0.55 to 2.0 times the number of moles of carboxylic acid residues. These materials are conveniently prepared by combining the diorganotin oxide and carboxylic acid in the desired molar ratio and heating the resultant mixture for several minutes at temperatures from about 25° to 60° C. The reaction can optionally be carried out in the presence of an organic or aqueous medium. Suitable organic media include acetone, methylethyl ketone, toluene, benzene, naptha, mineral spirits and mineral oil, among others. The product of this reaction is a solid material which is believed to be polymeric or at least oligomeric in nature. The repeating units of the polymer exhibit the formula

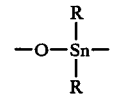

wherein R represents the hydrocarbon groups present on the initial diorganotin oxide, $R_2SnO$ wherein R is defined hereinafter. It will be understood that residues of the carboxylic acid are located at the ends of the polymer chains when a monocarboxylic acid is employed. If a dicarboxylic acid is reacted with the diorganotin oxide the acid residues are present either in the middle or at the ends of the chain.

The hydrocarbon portion of the diorganotin oxide, represented by R in the formula $R_2SnO$, contains between 1 and 12 carbon atoms and can be alkyl, cycloalkyl, aryl, alkaryl or aralkyl. Representative alkyl groups include methyl, ethyl, n-propyl, iso-propyl, n-butyl, sec-butyl, tert-butyl, n-pentyl and neopentyl, in addition to linear and branched alkyl groups containing from 6 to 12 carbon atoms. When R is cycloalkyl it can be cyclopentyl, cyclohexyl, cycloheptyl or cyclooctyl. Representative aryl groups include phenyl and naphthhyl. Benzyl and β-phenylethyl are two of the more common aralkyl groups. When R is alkaryl it can, for example, be one of the isomeric tolyl, xylyl or ethylphenyl groups.

Those diorganotin oxides which are not commercially available can be readily prepared using known synthetic methods. One of these methods involves hydrolysis of a corresponding diorganotin dihalide, such as the dichloride. The dihalide is, in turn, obtained by reacting the corresponding organomagnesium halide, RMgX, when X represents halogen and R is as defined hereinbefore for the diorganotin oxide, with a stannic halide $SnX_4$. These preparative methods are well known and do not constitute any part of the present invention.

The carboxylic acid that is reacted with the diorganotin oxide to obtain the first component of the present stabilizer compositions contains from 4 to 20 carbon atoms and can be represented by the formula

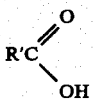

or HOOCR"COOH wherein R' represents alkyl, cycloalkyl, aryl, alkaryl or aralkyl and is selected from the same group as the R group present on the diorganotin oxide. The hydrocarbon groups represented by R" are divalent equivalents of R. Examples of suitable R" groups are alkylene containing between 1 and 12 carbon atoms, including methylene, ethylene, propylene and hexylene. R" can also be o-, m- or p- phenylene. When R" represents an aliphatic hydrocarbon residue it can contain a carbon-carbon double bond. In this instance R" is preferably —CH=CH— and the acid is maleic acid. Other suitable divalent hydrocarbon residues are

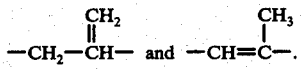

The carboxylic acids used in combination with the aforementioned products to improve odor and heat stability are either monofunctional or difunctional and contain from 8 to 20 carbon atoms. The hydrocarbon portion of the acid can be cyclic, linear or branched and may contain one or more carbon-carbon double bonds and one or more inert substituents that will not react with the organotin component of the present stabilizers. Representative substituents include, but are not limited to, halogen, hydroxyl, alkoxy and vic-epoxy

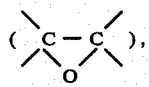

wherein the two free valences of each carbon are satisfied by at least one carbon atom and 1, 2 or 3 hydrogen atoms. Examples of substituted acids include 12-hydroxy stearic acid, 9,10-epoxy stearic acid and tetrachlorophthalic acid. Other suitable carboxylic acids include: octanoic, octanedioic, decanoic lauric, stearic, oleic, linoleic, elaidic, octadecanoic, eicosanoic and phthalic acids. In place of a carboxylic acid one can employ the corresponding acid anhydride. Mixtures containing two or more of the foregoing acids or anhydrides are also suitable.

As previously disclosed, the free carboxylic acid or anhydride constitutes from 1 to 90% of the combined weight of the organotin compound and the acid or anhydride. The weight ratio employed for any specific vinyl chloride polymer formulation is determined by a number of factors including the absence or presence of various compound adjuvants (including fillers, modifiers, flame retardants and pigments), blending and fabricating temperatures and pressures as well as residence time of the formulation in heated processing equipment.

The present two-component stabilizers are incorporated into formulations containing a vinyl chloride polymer or an acrylonitrile-butadiene-styrene terpolymer using the same methods employed for conventional organotin stabilizers. In accordance with one of these methods a homogeneous mixture containing the present stabilizers and the polymer in finely divided form, together with any other components of the formulation, is placed on a heated mill or is fed into the barrel of an extruder or other similar device that will heat the polymer to its softening point and evenly distribute the stabilizer and any other additives throughout the resultant melt. The melt is then formed into the desired product by molding, calandering or one of the other conventional techniques.

The excellent heat stability imparted to vinyl chloride polymers and acrylonitrile-butadiene-styrene terpolymers by the present mixtures of "overbased" diorganotin carboxylates and free carboxylic acids (or the anhydrides thereof) is further enhanced when these mixtures are employed in combination with one or more of the known antioxidants, including the phenolic type and triesters of phosphorous acid. Suitable phenolic antioxidants are sterically hindered phenols, including 2,6-di-tert-butyl-p-cresol, bis-phenol A [2,2-bis(4,4'-hydroxylphenyl) propane] and 2,2'thio-bis (4-methyl-6-tert-butylphenol). Tris(nonylphenyl)phosphite, phenyl diisodecyl phosphite and diphenyl decyl phosphite are representative of the phosphorous acid esters that can be used in combination with the present stabilizers. When these auxiliary stabilizers and antioxidants are employed they constitute from 0.5 to 30% of the combined weight of all stabilizers and antioxidants present in the polymer formulation.

As it is used in this specification the term "vinyl chloride polymer" refers to homopolymers of vinyl chloride and to copolymers wherein 50% or more of the repeating units are derived from vinyl chloride, the remainder being derived from one or more ethylenically unsaturated compounds that are copolymerizable with vinyl chloride. Suitable comonomers include vinylidine chloride, vinyl esters such as vinyl acetate, acrylonitrile, acrylic and methacrylic acids, and esters of these acids, including methyl metacrylate and butyl acrylate.

The term "acrylonitrile-butadiene-styrene terpolymer" refers to polymers wherein from 10 to 25% of the repeating units are derived from acrylonitrile and from 30 to 50% from butadiene, with the remainder being residues of styrene molecules. The ratio of styrene units to acrylonitrile units is preferably 70/30.

The following examples disclose preferred embodiments of the present stabilizer compositions and should not be interpreted as limiting the scope of the invention defined in the accompanying claims. All parts and percentages are by weight unless otherwise specified.

EXAMPLE 1

Preparation of "Overbased" Dibutyltin Maleate

A glass reactor equipped with an agitator, heater, thermometer, water-cooled condenser and a Dean-Stark trap was charged with 149.2 g. (0.6 mole) of di-n-butyltin oxide, 29.4 g. (0.3 mole) of maleic anhydride and 225 cc. of toluene. The mixture was heated to the boiling point (112° C.) and was maintained at that temperature for 30 minutes. A 70 cc. portion of the toluene in the reactor was replaced by a 200 cc. portion of acetone and the resultant mixture was thoroughly stirred. The acetone/toluene phase was then poured off and replaced with an equal volume of fresh acetone. The solid in the reactor was then isolated by filtration and dried for about 16 hours under reduced pressure. The dried solid weighed 163.0 g. (91% of theoretical yield).

The foregoing procedure was repeated using 124.35 g. (0.5 mole) of di-n-butyltin oxide and 24.5 g. (0.25 mole) of maleic anhydride with 100 cc. water as the reaction medium. In this instance the water and maleic anhydride were combined and heated to 50° C. to dissolve the anhydride. The solution was then cooled to 30° C., at which time the di-n-butyltin oxide was added. The resultant mixture was then heated to the boiling point (98° C.) and maintained at that temperature for 2 hours with stirring. The liquid phase was decanted and the solid washed with 200 cc. of water. The dried solid weighed 148.85 g. (98.5% of theoretical yield) and was found to contain 33.3% by weight of tin. The theoretical tin content for the reaction product of di-n-butyltin oxide and maleic anhydride in a 2:1 molar ratio, respectively is 34.0% by weight.

EXAMPLE 2

Preparation of "Overbased" Dibutyltin Maleate in the Absence of a Liquid Reaction Medium A mixture containing 2,506.2 g. (10.08 moles) of di-n-butyltin oxide and 493.8 g. (5.04 moles) of maleic anhydride was stirred at high speed (3600 R.P.M.) for 2 minutes. The wall of the vessel was cooled to maintain the temperature of the material below 35° C. The resultant mixture was allowed to stand at 25° C. for 72 hours, at which time it was in the form of an agglomerate which could readily be crushed into a powder.

EXAMPLE 3

Evaluation of "Overbased" Dibutyltin Maleate-Stearic Acid Blends as Heat Stabilizers A. In a Vinyl Chloride Polymer Various blends of (1) "overbased" di-n-butyltin maleate prepared according to the method of Example 2 using a 2:1 molar ratio of di-n-butyltin oxide to maleic anhydride (2) stearic acid and (3) 2,6-di-tert-butyl-p-cresol (a conventional antioxidant for vinyl chloride polymers) were prepared and blended with 100 parts by weight of a vinyl chloride homopolymer (PVC-450 available from Diamond Shamrock Corporation) and 0.5 part of a paraffin wax lubricant. Each formulation contained 1.4 parts of the overbased dibutyltin maleate and 0.1 part of the antioxidant. The formulations were milled for 5 minutes using a two-roll differential speed mill heated to a temperature of 163° C. The resultant sheet was then removed from the mill and a number of 1 × 1 inch (2.5 × 2.5 cm.) square samples were cut from the sheet and placed in a circulating air oven maintained at a temperature of 204° C. Samples were withdrawn from the oven after having remained there for 5, 10, 15, 20, 30 and 40 minutes. The samples were then rated for color using the Gardner scale of from 0 (colorless) to 20 (black). The color of each milled sheet was also rated. These color ratings are presented in the following table:

| Sample No. | Parts of Stearic Acid | Gardner Color After Heating For | | | | | | |
|---|---|---|---|---|---|---|---|---|
| | | 0' | 5' | 10' | 15' | 20' | 30' | 40' |
| 1 | 0 | 3 | 3 | 6 | 7 | 7 | 9 | 20 |
| 2 | 0.25 | 2 | 2 | 3 | 6 | 7 | 9 | 20 |
| 3 | 0.50 | 1 | 1 | 2 | 4 | 5 | 10 | 20 |
| 4 | 0.65 | 1 | 1 | 1 | 3 | 5 | 10 | 20 |

These data demonstrate that the addition of stearic acid retards the initial discoloration associated with heat induced degradation during the first 15 to 20 minutes of heating. From a practical standpoint retardation of color development during this time period is highly desirable, since this period is equivalent to the interval during which polymer formulations are exposed to elevated temperatures in commercial-scale blending and shaping equipment, which includes extruders, blenders, calander rolls and injection molding machines. In addition the odor of samples 2, 3 and 4 at 163° C. was noticeably less than the odor of sample 1 at the same temperature. Under the conditions employed in the aforementioned heat stability test vinyl chloride polymer formulations which do not contain a stabilizer are yellow in color following milling at 163° C. for 5 minutes. The presence of stearic acid, a known lubricant for vinyl chloride polymers, in amounts up to 2 parts per 100 parts of polymer without any other stabilizer does not impart any significant level of heat stability. The considerable improvement in initial color development achieved when stearic acid is added to a polymer formulation containing overbased diorganotin carboxylates is therefore considered surprising and unexpected. This improvement could, theoretically, result from a reaction between overbased dibutyltin maleate and stearic acid to form a mixture of dibutyltin maleate and dibutyltin stearate, both of which are effective heat stabilizers. To determine whether such a reaction did, in fact, occur a mixture of overbased dibutyltin maleate and free stearic acid prepared as described in Example 2 (stabilizer 1) was evaluated as a heat stabilizer together with a mixture of dibutyltin maleate, dibutyltin stearate and dibutyltin oxide (stabilizer 2). The relative concentrations of the components in stabilizer 2 were equivalent to the weights of dibutyltin species [ $(C_4H_9)_2Sn$ ], maleic acid residues and stearic acid present in the aforementioned stabilizer 1. The formulation employed to evaluate the stabilizers 1 and 2 contained 100 parts of a vinyl chloride homopolymer, 2 parts of stabilizer and 0.5 parts of a paraffin wax lubricant. Stabilizer 1 contained 66.6% by weight of the reaction product of dibutyltin oxide and maleic anhydride in a 2:1 molar ratio, respectively, 26.7% stearic acid and 6.7% 2,6-di-tert-butyl-p-cresol. Stabilizer 2 contained 39.13% of stoichiometric dibutyltin maleate (reaction product of dibutyltin oxide and maleic anhydride in a 1:1 molar ratio), 37.90% of stoichiometric dibutyltin stearate (reaction product of dibutyltin oxide and stearic acid in a 1:2 molar ratio, respectively), 37.90% dibutyltin oxide and 6.70% 2,6-di-tert-butyl-p-cresol. The results of this heat stability evaluation are summarized in the following table.

|  | Gardner Color Rating After Heating Sample at 204° C. for | | | | | | |
| --- | --- | --- | --- | --- | --- | --- | --- |
|  | 0' | 5' | 10' | 15' | 20' | 30' | 40' |
| Stabilizer 1 | 1 | 1 | 1 | 2 | 4 | 7 | 19 |
| Stabilizer 2 (control) | 1 | 2 | 3 | 5 | 7 | 11 | 20 |

These data demonstrate that the heat stability imparted by the present stabilizers is not the result of a reaction between the free carboxylic acid component and the diorganotin oxide moieties present in the overbased diorganotin carboxylate to form a diorganotin derivative of the initially free carboxylic acid.

B. In An Acrylonitrile-Butadiene-Styrene Terpolymer

The "overbased" di-n-butyltin maleate employed in part A of this example was evaluated as a heat stabilizer for an acrylonitrile-butadiene-styrene terpolymer available as Blendex ® 401 from the Borg-Warner Corporation and compared with (1) a mixture containing this stabilizer (1.0 part) in combination with 0.3 parts of stearic acid and (2) stearic acid alone. The total stabilizer concentration in both formulations was 1.3 parts per 100 parts of polymer.

The heat stability test was conducted as described in part A of this example, the only difference being that the temperature of the mill was 138° C. and samples were removed from the oven at 10 minute intervals. Throughout the first 40 minutes of heating, the samples containing both the organotin compound and stearic acid were slightly less yellow than the samples containing only the organotin compound. Both these sets of samples exhibited less discoloration following a given interval of heating than the set of samples containing only stearic acid. The fact that a sample containing 1.0 part of the overbased di-n-butyltin maleate and 0.3 part of stearic acid is superior to a sample containing the organotin compound alone at a concentration of 1.3 parts is therefore surprising and unexpected since stearic acid is a considerably less effective stabilizer than the organotin compound.

EXAMPLE 4

Preparation of Representative Overbased Diorganotin Carboxylates

A. Dibutyltin Benzoate

A 49.74 g. (0.2 mole) portion of dibutyltin oxide and 22.62 g. (0.1 mole) of benzoic anhydride were intimately mixed in a Waring ® Blender for 1 minute. A reaction initiated almost immediately, as demonstrated by infrared spectroscopy. After standing at ambient temperature for about three weeks, the reaction appeared to be complete. Infra-red spectroscopic analysis of the product demonstrated that virtually all the original anhydride had been consumed, as demonstrated by the disappearance of absorption maxima at 5.6μ and 5.8μ. New absorption maxima at 6.3μ and 6.5μ are indicative of the presence of

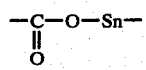

moieties.

B. Dibutyltin Stearate

Dibutyltin oxide 49.74 g. (0.2 mole) and 55.10 g. (0.1 mole) of stearic anhydride were blended to form a homogeneous mixture. Formation of a product began at once but proceeded slowly. After the mixture had been heated at 45° C. for about 20 hours, the reaction appeared to have reached completion. Infra-red spectrographic evidence for this was the disappearance of absorption peaks at 5.55μ and 5.65μ, belonging to the originally present anhydride, and the appearance of absorption peaks at 6.15μ and 6.45μ, indicative of the organotin carboxylate group,

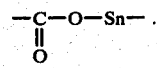

C. Dibutyltin Phthalate

Dibutyltin oxide (99.48 g., 0.4 mole) and 29.62 g. (0.2 mole) of phthalic anhydride were homogeneously blended according to the method of Example 4. The reaction was substantially complete following heating of this mixture at 65° C. for about 24 hours. An infra-red spectrum showed complete disappearance of the absorption maxima for phthalic anhydride at 5.4μ and 5.7μ and the appearance of a broad absorption peak at 6.3, indicative of the organotin phthalate functional group,

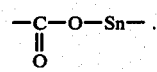

What is claimed is:

1. A method for improving the resistance to heat induced discoloration, decomposition and odor imparted to vinyl chloride polymer and acrylonitrile-butadiene-styrene terpolymers by a diorganotin compound selected from the group consisting of reaction products of mono- or dicarboxylic acids containing from 4 to 20 carbon atoms or anhydrides of said acids with a diorganotin oxide containing from 2 to 24 carbon atoms, wherein the number of moles of diorganotin oxide reacted is from 1.0 to 2.0 times the number of equivalents of acid or anhydride, the method consisting essentially of combining said diorganotin compound with an unreacted mono- or dicarboxylic acid containing from 8 to 20 carbon atoms or an anhydride of said acid, wherein said unreacted acid or anhydride constitutes from 1 to 90% of the combined weight of the acid or anhydride and the reaction product, the carboxylic acid that is reacted with the diorganotin oxide exhibits the formula

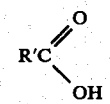

or HOOCR"COOH wherein R' represents alkyl, cycloalkyl, aryl, alkaryl or aralkyl and contains from 1 to 12 carbon atoms and wherein the hydrocarbon portion of said unreacted acid or anhydride contains from 8 to 20 carbon atoms in a cyclic, linear or branched configuration and no substituents which are reactive with said diorganotin oxide.

2. A method according to claim 1 wherein the diorganotin oxide exhibits the formula R₂SnO, wherein R contains from 1 to 12 carbon atoms and is selected from the group consisting of alkyl, cycloalkyl, aryl, alkaryl and aralkyl.

3. A method according to claim 2 wherein R is alkyl.

4. A method according to claim 2 wherein R is n-butyl.

5. A method according to claim 1 wherein the acid that is reacted with the diorganotin oxide exhibits the formula HOOCR'COOH wherein R' is selected from the group consisting of alkenylene and phenylene.

6. A method according to claim 5 wherein R' is selected from the group consisting of —CH=CH—,

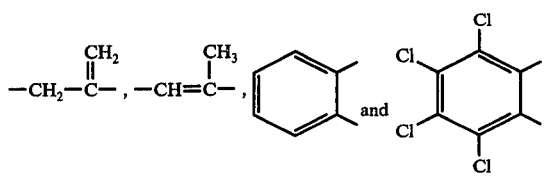

7. A method according to claim 1 wherein the ratio between the number of moles of diorganotin oxide and the number of equivalents of acid reacted with said oxide is 1:1.

8. A method according to claim 1 wherein the free carboxylic acid is selected from the group consisting of monocarboxylic acids of the formula

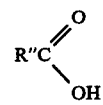

wherein R" contains from 7 to 19 carbon atoms and is, in turn, selected from the group consisting of alkyl, aryl, aralkyl and alkaryl.

9. A method according to claim 8 wherein the free carboxylic acid is stearic acid.

10. A method according to claim 1 wherein the free carboxylic acid constitutes from 5 to 30%, based on the total weight of all stabilizers and antioxidants.

11. A method according to claim 1 wherein the polymer composition contains an antioxidant selected from the group consisting of sterically hindered phenols and triesters of phosphorus acid.

12. A method according to claim 11, wherein the antioxidant constitutes from 0.5 to 30%, based on the total weight of all stabilizers and antioxidants.

13. A method according to claim 1 wherein the hydrocarbon residue of said unreacted acid or anhydride contains a carbon-carbon double bond.

14. A method according to claim 1 wherein the hydrocarbon residue of said unreacted acid or anhydride contains at least one substituent selected from the group consisting of halogen, hydroxyl, alkoxy and vic-epoxy.

* * * * *